Nov. 8, 1966 W. A. DONOHUE ET AL 3,283,520

THERMOELECTRIC COOLER FOR OXYGEN TENTS

Filed March 30, 1965

4 Sheets-Sheet 1

INVENTORS
WALTER A. DONOHUE
NORMAN A. MARTIN

BY George H. Fritzinger
AGENT

INVENTORS
WALTER A. DONOHUE
NORMAN A. MARTIN
BY George H. Fritzinger
AGENT

INVENTORS
WALTER A. DONOHUE
NORMAN A. MARTIN

BY George H. Fritzinger
AGENT

THERMOELECTRIC COOLER FOR OXYGEN TENTS

Filed March 30, 1965 4 Sheets-Sheet 4

INVENTORS
WALTER A. DONOHUE
NORMAN A. MARTIN

BY George H. Fritzinger
AGENT

United States Patent Office 3,283,520
Patented Nov. 8, 1966

3,283,520

THERMOELECTRIC COOLER FOR OXYGEN TENTS

Walter A. Donohue, Scotch Plains, and Norman A. Martin, Kearny, N.J., assignors to McGraw-Edison Company, Elgin, Ill., a corporation of Delaware Filed Mar. 30, 1965, Ser. No. 443,785
12 Claims. (Cl. 62—3)

This invention relates to an improved thermoelectric cooler especially adapted for oxygen tents.

An object of the invention is to provide an improved cooler for oxygen tents which is silent in operation, compact and efficient.

Another object is to provide a novel design of thermoelectric cooler for oxygen tents which can be readily cleaned and sterilized.

Another object is to provide a compact, economical and durable thermoelectric cooler having a load capacity sufficient to maintain the temperature in an oxygen tent at a maximum differential of 12° F. below the ambient temperature up to ambient temperatures of 95° F. A further object is to provide such improved thermoelectric cooler which is capable of holding the temperature in the oxygen tent within plus or minus 1° F. of a preset value over protracted periods.

Another object is to provide such thermoelectric cooler which is capable of removing the moisture from high humidity atmosphere in the oxygen tent without freeze clogging the cooler.

A feature of the invention resides in a thermoelectric cooler which is easily accessible at the top and which is of a tank form enabling it to be cleaned and sterilized by a flushing operation.

Another feature resides in a compact and novel structural arrangement of thermoelectric cooler which achieves a high cooling efficiency. In this connection all cooling surfaces are inwardly directed and in close thermal association with a central cooling air duct thermally insulated from the outside exhaust or hot air ducts through which the room air is circulated. Also, to keep external duct work to a minimum a U-shaped cooling duct is employed in the cooler so that both inlet and outlet ports of the cooling duct are in proximity with the oxygen tent.

Other objects and features of the invention will be apparent from the following description and the appended claims.

In the description of our invention reference is had to the accompanying drawings, of which:

Figure 1:
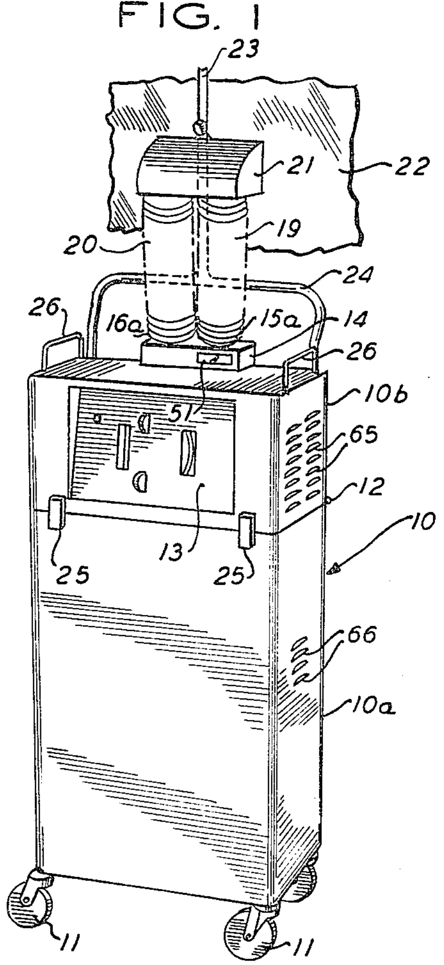
FIGURE 1 is a perspective view of a novel thermoelectric cooling apparatus for oxygen tents according to our invention, showing a portion of an oxygen tent connected thereto.

The present thermoelectric cooling apparatus comprises a cabinet 10 of rectangular shape as viewed from the top and sides. The cabinet includes a lower section 10*a* mounted on casters 11 and an upper smaller section 10*b* secured along the back lower edge thereof to the lower section by a piano hinge 12. The upper section can thus be tilted rearwardly to expose the lower cabinet section to view from the top thereof.

The upper section 10*a* has an obliquely inset control panel 13 at its front side and has an upstanding coupling box 14 at its upper rearward portion provided with inlet and outlet ports 15 and 16 for a cooling duct 17 (FIGURE 5) of a thermoelectric cooling unit 18. The ports 15 and 16 have surrounding lips 15*a* and 16*a* for coupling engagement with flexible air hoses 19 and 20. These hoses lead to a coupling box 21 of quarter-round shape as viewed from the end. The box 21 has inlet and outlet ports (not shown) which are adapted to be connected to an oxygen tent 22 fractionally indicated.

The coupling box 21 is supported at a selected height by an upright standard 23 which is integral with a yoke 24 that is fitted into corner holes of the cabinet. The upper cabinet section 10*a* is latched closed by clasps 25. Side handles 26 on this upper section enable the cabinet to be wheeled easily by hand from place to place.

The thermoelectric cooling unit 18 is supported in the lower cabinet section 10*a* flush with the top of this section. The cooling unit includes a cooling exchanger 27 (FIGURE 5) of a tank form having an upper rectangular section and a lower triangular section. The upper section includes two rectangular aluminum side plates 28*a* and 28*b* in spaced vertical arrangement inset from the front and back walls of the cabinet and extending substantially through the full width of the cabinet. The plates 28 are bridged by plates 29 at the ends and by a vertical partition wall 30 at the center. The lower triangular section of the tank comprises triangular side plates 31 in vertical alignment with the side plates 28. These triangular plates are bridged along their oblique lower sides by inset plates 32*a* and 32*b* dottedly indicated in FIGURE 5. The central partition 30 divides the tank into a U-shaped cooling duct 17 having an inlet opening at the right side into which air from the tent is drawn as indicated by the arrows 33*d*, a lower curved duct is indicated by the arrows 33*c* and an outlet duct at the left half side as indicated by the arrows 33*u*.

The entire cooling duct 17 is filled with spaced parallel cooling fins. In the upper rectangular section of the tank there is a group of spaced individual fins 34 of which one set of alternate fins 34*a* have edges inset and soldered in respective vertical grooves 35*a* in the side plate 28*a* and the other set of intermediate fins 34*b* have edges inset and soldered in vertical grooves 35*b* in the side plate 28*b*. The fins bridge the distance between the two side plates 28 and have their far end portions bent over at right angles to present border portions 34*c* contiguous with the opposite side walls. In the lower triangular section of the tank there is a group of spaced vertical triangular fins 35 of which one set of alternate ones are inset and soldered to the oblique plate 32*a* and of which the other set of alternate ones are inset and soldered to the plate 32*b* in the same manner as the fins 34. By so rigidly securing each fin to only one side plate the tank construction allows for expansion and construction responsive to varying temperature conditions.

The spacing of the cooling fins must be sufficient to permit the condensed moisture from the vapor-laden air of the oxygen tent to flow freely down the fins to a collection chamber at the bottom of the tank. If the spacing is too small, globules of water will build up and bridge the space between adjacent fins to impede the air circulation. It is found that nickel-plated copper fins .021″ thick and 4″ wide (the spacing between the side plates 28) by 8" high spaced at approximately 1/8" intervals are satisfactory for the present purposes.

Figure 2:
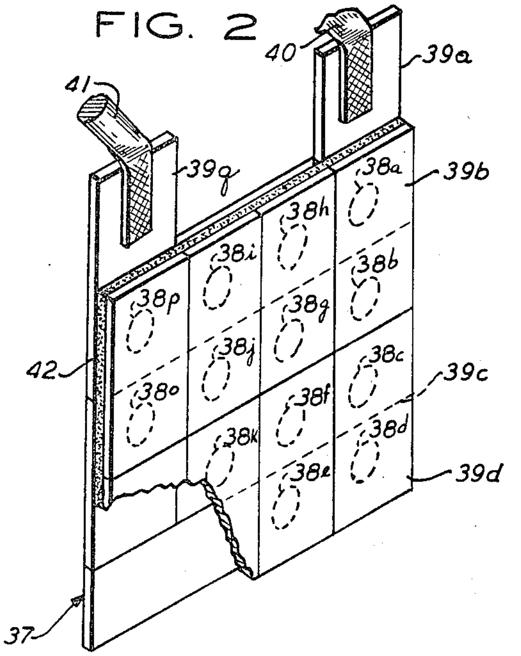
FIGURE 2 is an isometric view to enlarged scale but with a portion broken away of one of the plurality of thermoelectric modules used in the cooler.
Figures 5, 6:
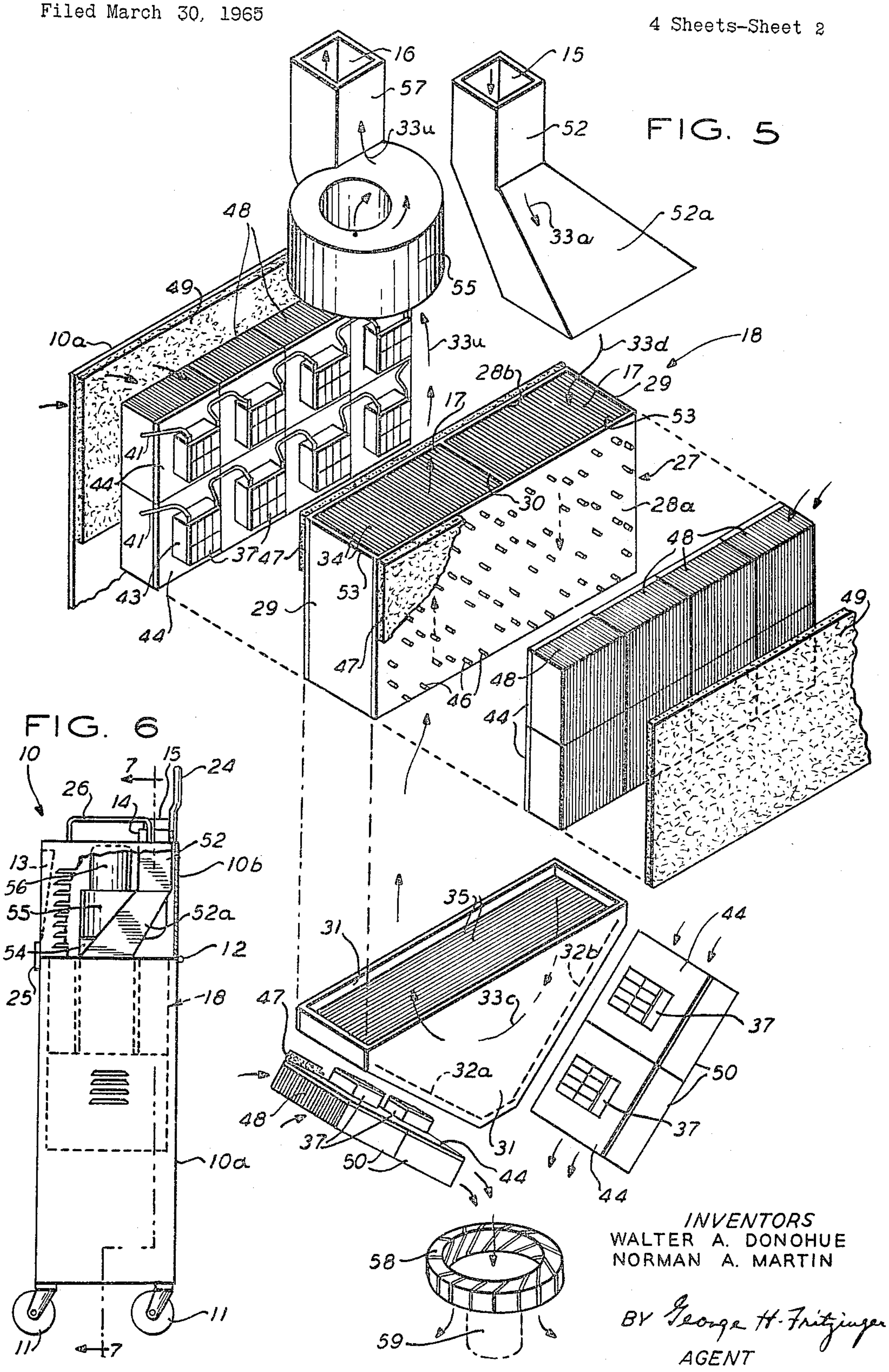
FIGURE 5 is an exploded isometric view of the thermoelectric cooler illustrating both the cool air and hot air ducts and the respective blowers for these ducts.
FIGURE 6 is a side elevational view of the thermoelectric cooling apparatus with portions broken away to illustrate better the internal constructions.
Figure 7:
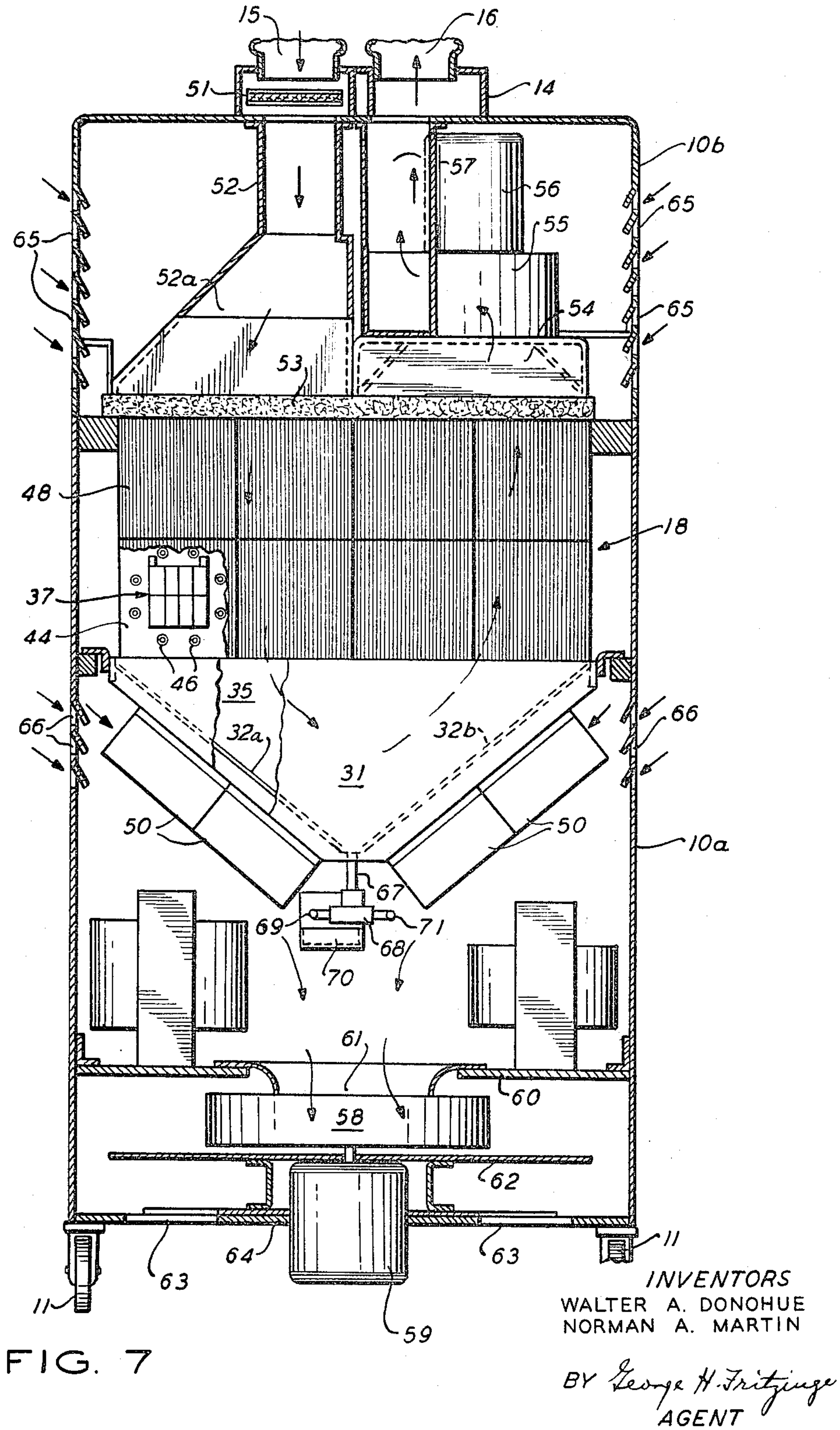
FIGURE 7 is a rear view of the thermoelectric cooling apparatus with portions in section substantially on the line 7—7 of FIGURE 6.

Against the outer wall of each side plate 28*a* and 28*b* are applied eight thermoelectric modules 37 in a spaced checkerboard arrangement as shown in FIGURE 5. By way of example each side plate 28 may be 16" long and 8" high, and each thermoelectric module may be 2" square and set within a 4" square area of the respective side plate. Each thermoelectric module 37 comprises a group of sixteen thermoelectric elements 38 each typically 7 millimeters in diameter and 1/8" long. The thermoelectric elements are preferably made of solid bismuth telluride but alternate ones in each module are doped differently so as to be respectively of positive and negative types. The thermoelectric elements 38 of each module are soldered between a block formation (FIGURE 2) of rectangular copper plates 39 all insulated from each other along their adjacent edges. For instance, there is a first copper plate 39*a* one half of which forms a terminal lug soldered to a copper strap 40. The other half of this copper plate 39*a* overlaps a first portion of a second copper plate 39*b* and between these halves is a first thermoelectric element 38*a*. The other half of the plate 39*b* overlaps a first half portion of a plate 39*c* and between these halves is a second thermoelectric element 38*b*. Likewise, the second half of the plate 39*c* overlaps a first half of a copper plate 39*d* and between these halves is a third thermoelectric element 38*c*, etc., leading to a copper plate 39*q* one half of which serves as a second terminal lug. Soldered to this terminal lug is a copper strap 41. Thus, when a current is passed between the two terminal lugs, the direction of the current through successive thermoelectric elements is reversed with the result, since the successive thermoelectric elements are alternately positive and negative types, that all junctions with the plates 39 at one side of the module are cold junctions and all junctions with the plates 39 at the other side of the module are hot junctions. In the space around the thermoelectric elements 38 and between the opposite sides of each module there is a filling of insulation 42 as of foam plastic.

The cold sides of the thermoelectric modules 37 are applied flat against the plates 28*a* and 28*b* through films of Isomica and silicone grease to provide suitable electrical insulation. The hot sides of the modules are cemented rigidly to spacing copper blocks 43 by means of an epoxy resin doped with aluminum powder to increase its thermal conductivity while still retaining its electrical insulating properties. Each spacing block 43 is equal in cross section to the face area of the respective module and is approximately 3/4" thick. Soldered to the far side of each spacing block 43 is a copper fin base plate 44 of a heat rejection exchanger. This fin base plate 44 is preferably about 1/4" thick. The use of the spacing blocks 43 increases the separation between the cooling fin base plates 28 and the adjacent heat rejection fin base plates 44 to approximately 1". Such separation of these plates increases the thermal insulation therebetween. Eight screws 45 with nylon spaces 46 set at equal intervals around each spacing block 43 serve to secure the heat rejection fin base 44 to the cooling fin base plate 28. The space between these plates is filled with an insulation 47 as of foam plastic.

Figures 3, 4:
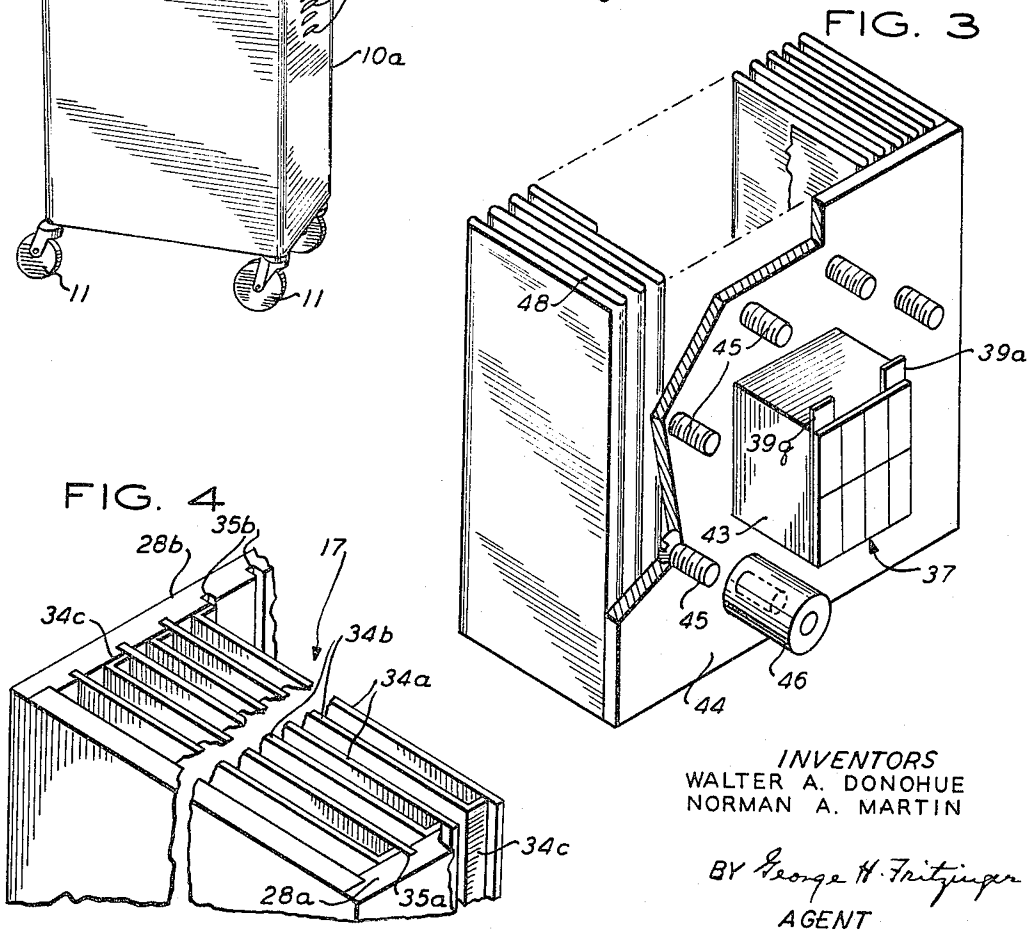
FIGURE 3 is an isometric view partly broken away of a heat rejection exchanger as applied to the hot side of a thermoelectric module.
FIGURE 4 is a partial isometric view showing the cooling fin arrangement in the cooling duct of the thermoelectric cooler.

The fin base plate 44 for each thermoelectric module 37 is preferably approximately 4" square. Thus, sixteen modules with assembled heat rejection fin base plates 44 can be assembled in a rectangular area 8" high and 16" long to conform to the area of the respective cooling fin base plates 28 as is shown in FIGURE 5. The electric cable connections 40 and 41 between the modules are kept near the fin base plates 44. Soldered to the outer side of the fin base plates 44 are heat rejection fins 48 preferably made of one thin strip folded back and forth on itself at suitable spacing and soldered along one set of their curved ends to the respective plate 44 (FIGURE 3). There are preferably 52 fins each 2" wide and 4" high for each fin base plate 44 of which the fin stock may be copper .011" thick. The 2" dimension of the fins bridge the space between the fin base plates 44 and the opposing walls of the cabinet 10 less the thickness of a foam insulation pad 49 applied against the inner walls of the cabinet.

Two modules 37 with heat rejection exchangers 44–48 are mounted with their cool sides against the inclined lower wall 32*a* and another two modules 37 are so mounted against the inclined lower wall 32*b* as shown in FIGURE 5. The heat rejection fins 48 of each of these pairs of modules are encased in a box 50 open only at the ends with the fins running lengthwise of the box so that air can be drawn therethrough.

From the above description it is apparent that the cooling duct 17 has cooled opposite walls 28*a* and 28*b* throughout the rectangular portion of the tank and has cooled oblique end walls throughout the reversely curved bottom portion of the tank. Further, the fins 34 in the rectangular portion of the tank and the fins 35 in the lower triangular portion thereof are all in direct metal-to-metal contact with the base plates at the cool sides of the modules.

In the upper cabinet section 10*b* there is a lint trap 51 in the coupling box below the inlet port 15, which is slide mounted in the manner of a drawer so that it can be easily removed and cleaned. A duct 52 leads downwardly from the lint trap and terminates in an outwardly flared lower portion 52*a* which is also inclined sidewise (FIGURE 6) to terminate in a rectangular opening that conforms to the inlet end of the cooling duct 17. A layer 53 of foam insulation surrounds the inlet end of the cooling duct so that when the upper cabinet section 10*b* is closed the duct 52 will be sealed air tight in coupled relation to the inlet of the cooling duct 17. Similarly, a duct 54 with a rectangular open end conforms to the outlet end of the cooling duct 17 and is sealed thereto by foam insulation 53 when the upper cabinet section is closed. This duct is flared inwardly and leads into a blower 55 driven by motor 56. Leading off from the blower at the back side of the cabinet is a duct 57 which extends upwardly through the exit port 16. The blower 55 circulates air from the oxygen tent through the cooling duct 17 and back to the tent.

At the bottom of the lower cabinet section 10*a* there is a heat rejection blower 58 driven by a motor 59. Directly above the blower is a partition wall 60 having a central flared opening 61 leading from the center of the blower. Below the blower is a rectangular baffle plate 62 which confines the air thrown centrifugally from the blower in horizontal directions until it reaches nearly the side walls of the cabinet. Thereafter the air is drawn around the edge of the baffle plate and outwardly through ports 63 in the bottom wall 64 of the cabinet supporting the motor.

The air through the heat rejection blower 58 is drawn past the heat rejection fins above described via two different paths. One path is through louvers 65 in the left and right sidewalls of the upper cabinet section 10*b* and thence past the heat rejection fins 48 between the respective fin base plates 44 and the front and back sidewalls of the cabinet and next through the space between the respective triangular side plates 31 and the front and back walls of the cabinet. The other path is via louvers 66 in the left and right sidewalls of the lower cabinet section and thence through the fin boxes 50 to the central opening 61. Thus, the blower 59 draws cooling room air past all of the heat rejection fins of the thermoelectric cooling unit to lower the temperature of the hot junctions of the thermoelectric modules. As heat is carried away from the hot junctions the efficiency of the modules is increased to lower further the temperature of the cold junctions thereof.

At the bottom of the tank there is a drain pipe 67 leading to a three-way valve 68. In a first position of this valve the drain pipe 67 empties through an exit 69 into a drip pan 70 which is slide mounted in the manner of a drawer so that it can be easily removed and emptied. The valve is normally set in this first position so that condensate from the tent atmosphere is collected by the drip pan. In a second valve position the drain pipe 67 empties via an exit 71 through the back of the cabinet. This is the position in which the valve is set when the tank is flushed to clean and sterilize the same. In a third position of the valve, the same is closed so that the tank can be filled with a cleaning fluid temporarily as before the tank is flushed.

The electrical resistance is approximaely .0015 ohm per junction of the thermoelectric cooler. At an operating current of 52 amperes the thermoelectric cooler will lower the temperature of the tent atmosphere by 12° F. from an outside ambient temperature of 95° F. when there is a total heating load in the tent of 1200 B.t.u. This is a typical heat load when a person is at rest in the tent and the temperature differential between the tent atmosphere and the outside atmosphere is at the maximum of 12° F. When room air is used to cool the heat rejection fins at the hot sides of the modules, the minimum temperature at the cold side is of the order of 43° F. Since this is the lowest temperature that can be reached there is no problem of the moisture condensed from the air of the tent ever freezing and clogging the cooler.

Figure 8:
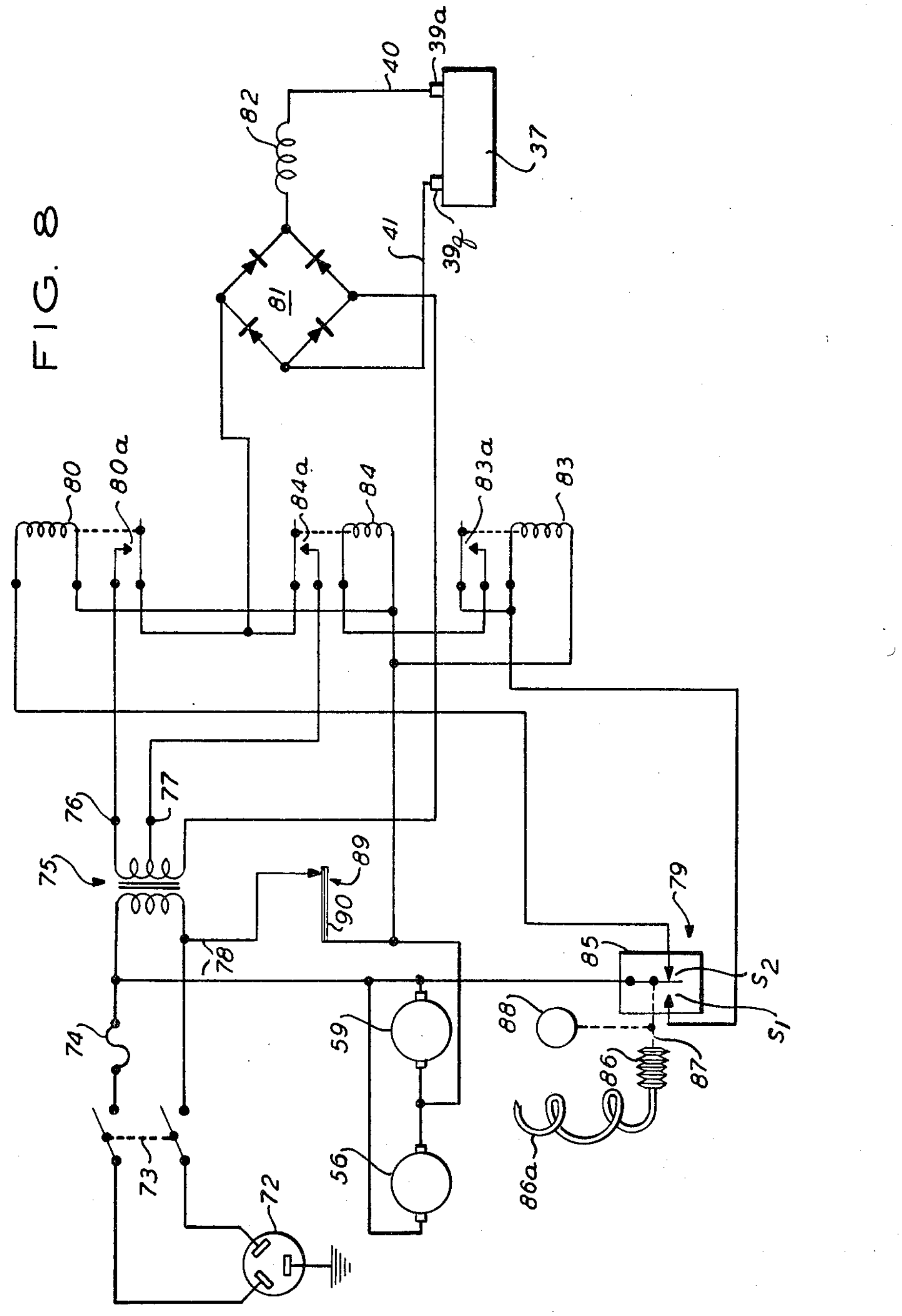
FIGURE 8 is a schematic diagram of the power and control circuits of the present thermoelectric cooler.

The present thermoelectric cooler is operated from a 110 volt 60 cycle power source (FIGURE 8) through an on-off switch 73, fuse 74 and step-down power transformer 75. The transformer 75 has a 17 volt secondary winding 76 provided with a tap 77 of 5 volts. When the on-off switch is closed, the 110 volt circuit 78 is led from the primary side of the transformer to energize both of the blower motors 56 and 59 and to energize a relay 80 via a temperature control switch 79. When the temperature of the atmosphere in the oxygen tent is above the manual setting of this switch the switch occupies its $S_2$ position as shown. Activation of the relay 80 closes its switch 80*a* to connect the 17 volt secondary winding 76 through a full wave rectifier 81 and choke 82 across the series of thermoelectric modules 37 in the thermoelectric cooler. This activation of the modules continues until the temperature in the tent falls to the setting of the controller 79. When this occurs the controller 79 is shifted automatically to its $S_1$ position. This shift in the controller immediately drops the relay 80 to disconnect the the thermoelectric cooler from the 17 volt winding and, simultaneously, it connects the 110 volt power line across a time delay relay 83 whose time delay is only sufficient to delay the operation of the relay 83 until the relay 80 has dropped out. When the relay 83 is operated it closes its switch 83*a* to connect a relay 84 across the 110 volt power line. Operation of the relay 84 causes its switch 84*a* to connect the thermoelectric modules via the choke 82 and rectifier 81 across the 5 volt portion of the secondary winding. This reduced activation of the thermoelectric modules continues until the temperature in the tent rises above the setting of the controller 79 at which point the controller shifts back to its $S_2$ setting to start again a higher level activation of the thermoelectric cooler. By this alternate operation of the thermoelectric cooler between higher and lower levels of energization the temperature in the tent is kept to within plus or minus 1° F. of the setting of the controller 79.

The temperature controller 79 may be any standard manually settable thermally responsive switch. Only by way of illustration it may comprise a microswitch 85 operable by a bellows 86 coupled to a coiled tube 86*a* in the cool air duct 17 of the cooler. The coiled tube 86*a* and the bellows 86 are filled with an expansible gas. A coupling 87 between the bellows and the microswitch may be adjustable by a manual control knob 88. Thus, by adjusting the manual control knob 88 the temperature setting at which the microswitch is operated can be suitably varied.

For safety measures a thermal switch 89 comprising for instance a bimetal 90 attached to one of the heat rejection fins in the hot air chamber is connected in the power line to the motors 56 and 59 and to the relays 80, 83 and 84. If anything should go wrong with the equipment resulting in an inordinate temperature rise of the hot junctions of the thermoelectric cooler, the switch 89 will open at a preset safe temperature to cut off the current to the thermoelectric modules.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. A thermoelectric cooler for an oxygen tent comprising a cabinet having inlet and outlet ports, a cooling air duct in said cabinet between said ports, a hot air duct in said cabinet thermally insulated from said cooling air duct, a plurality of thermoelectric modules each comprising at least one thermoelectric element and heat exchangers in close thermal association with the hot and cold junctions of said element, said heat exchanger at the cold junction being thermally associated with said cooling air duct and said heat exchanger at the hot junction being thermally associated with said hot air duct, said heat exchangers including fins extending through said hot and cool air ducts, a blower for circulating air from said oxygen tent through said cool air duct, a separate blower for circulating room air through said hot air duct, the thermoelectric elements of each of said thermoelectric modules being cylindrically shaped and in spaced parallel arrangement having opposite end faces in respective parallel planes, conductor straps electrically connecting the end faces of successive pairs of said elements in a series arrangement with the elements of each such pair being of opposite polarity so that all hot junctions lie in one of said planes and all cold junctions in the other of said planes, the straps in each plane having the edges in close contiguous relationship to form a substantially complete module surface, a base plate forming a wall portion of said cooling air duct and applied to the module surface at said cold junctions via an interface film of electrically insulating and heat conducting material, a spacing block having one face applied to the module surface at said hot junctions via an interface film which is electrically insulating and heat conducting, a base plate applied to a face of said spacing block opposite said one face and forming a wall portion of said hot air duct, said base plate having surface areas substantially larger than said module surfaces, and a foam insulation between said base plates in the space around said spacing blocks.

2. The thermoelectric cooler set forth in claim 1 wherein said interface film at the cold junction side of said module is a nonrigid one including a silicone grease and wherein said interface film at said hot junction side is a rigid one including an epoxy resin loaded with metallic powder.

3. A thermoelectric cooler for an oxygen tent comprising an upright rectangular cabinet having inlet and outlet ports at the top adapted for hose connections with the oxygen tent, a tank set into said cabinet having an upper rectangular portion and a lower triangular portion as viewed from the side, a plurality of thermoelectric modules having spaced parallel hot and cold module surfaces at opposite sides thereof, a frame structure supporting said plurality of thermoelectric modules with the cold module surfaces thermally associated with opposite sidewalls of said tank, conductor plates joined to said hot module surfaces and spaced from the walls of said cabinet, said cabinet having openings to the outside forming a hot air duct via side chambers between said conductor plates and the side walls of said cabinet, a central partition wall vertically extending from the top of said tank downwardly to said triangular section to form a U-shaped cool air duct, means coupling said cool air duct to said ports including a blower for circulating air through said cool air duct from the oxygen tent, heat exchange metal fins in said cool air duct and in metal-to-metal contact with said side walls of said tank to increase the heat exchange area of said cold module surfaces, and other heat exchange metal fins in said hot air duct and in metal-to-metal contact with said conductor plates to increase the heat exchange area of said hot module surfaces.

4. The thermoelectric cooler set forth in claim 3 wherein said cabinet has side louvers forming an inlet to said hot air duct and has an opening in the bottom wall forming an outlet for said hot air duct, and wherein said first blower is located at the bottom of the housing below said thermoelectric modules and is of a centrifugal type.

5. The thermoelectric cooler set forth in claim 3 including an outlet opening at the bottom of said tank, a drip pan below said tank, a pipe leading through the rear wall of said cabinet, and a coupling to said outlet opening including at three-way valve operable either to close said tank, connect said outlet opening to said pipe so that water flushed through the tank can drain out through the back of the cabinet, or to connect the tank to said drip pan to collect moisture condensed from the air circulating through the cooler from said oxygen tent.

6. The thermoelectric cooler set forth in claim 3 wherein said hot and cold modules include thermoelectric elements thermally interposed between minor portions of the surface areas of the modules, and wherein the space between the remaining portions of the surface areas of the modules is filled with a foam insulation.

7. The thermoelectric cooler set forth in claim 3 wherein said cabinet includes an upper cabinet section above the thermoelectric cooling unit hinged at the back to a lower cabinet section to swing upwardly into an open position, said upper cabinet section including said second blower and air ducts leading from said inlet and outlet ports to the inlet and outlet openings of said cool air duct when the upper cabinet section is closed, said upper cabinet section serving to expose said cool air duct from the top when the upper cabinet section is opened whereby to enable water to be flushed through the cool air duct to clean the same.

8. A thermoelectric cooler for an oxygen tent comprising an upright rectangular cabinet having an upper section hinged at the back to swing rearwardly into an open position, a thermoelectric cooling unit in the lower section of said cabinet exposed at the top by the opening of said upper cabinet section, said cooling unit comprising a tank structure having two opposite walls spaced from the corresponding side walls of the lower section of said cabinet, a plurality of thermoelectric modules having spaced parallel hot and cold module surfaces, means supporting said modules in a group arrangement whereby the cold surfaces thereof are in thermal contact with the outside surfaces of said two opposite walls of said tank structure, a central vertical partition in said tank structure to form therein a U-shaped cool air duct having inlet and outlet openings at the top of the tank structure, inlet and outlet ports in said upper cabinet section to be connected to an oxygen tent, ducts in said upper cabinet section leading from said ports and fitting respectively at their lower edges around said inlet and outlet openings of said cool air ducts when said upper cabinet section is closed, conductor plates thermally associated with said hot module surfaces and spaced from the adjacent side walls of said cabinet to form hot air spaces therebetween, louvers in the side walls of said cabinet and an opening in the bottom portion of the cabinet for completing hot air ducts via said hot air spaces, a first blower for said cool air duct mounted in said upper cabinet section, a second blower for said hot air duct mounted at the bottom of said lower cabinet section, and heat exchange fins in said cool and hot air ducts.

9. The thermoelectric cooler set forth in claim 8 wherein one set of alternate heat exchange fins in said cool air duct is soldered to one of said walls of said tank and the second set of intermediate heat exchange fins is soldered to the said opposite wall of said tank, each of said fins bridging the width of said cool air duct in said tank structure.

10. The thermoelectric cooler set forth in claim 8 wherein said tank structure has a triangular shaped bottom section as viewed from the side closed by inclined walls at the bottom, a plurality of thermoelectric modules having their cold junctions in close thermal association with the outside surfaces of said inclined walls, triangular heat exchange fins in said lower section of which one set of alternate fins is soldered to the inside surfaces of one of said inclined walls and of which the other set of intermediate fins is soldered to the inside surface of the other of said inclined walls, heat exchange fins thermally associated with the outer hot junctions of said plurality of thermoelectric modules, and louvers in the side walls of the lower section of said cabinet for enabling air to be drawn by said second blower past the heat exchange fins of said plurality of thermoelectric modules.

11. A thermoelectric cooler for an oxygen tent comprising a lower cabinet section and an upper cabinet section hinged to the lower section, inlet and outlet ports in said upper cabinet section for coupling with an oxygen tent, a thermoelectric cooler in said lower cabinet section including an upright U-shaped cooling air duct having inlet and outlet openings exposed to view when said upper cabinet section is swung to open position, ducts in said upper cabinet section for coupling said ports to the inlet and outlet openings of said cooling air duct when said upper section is closed, a drain at the bottom of said cooling air duct, a receptacle for collecting moisture condensed from the air passing through said cooling air duct, an outlet on said cabinet, and a valve selectively operable to conduct said drain to either said receptacle or to said outlet.

12. The thermoelectric cooler set forth in claim 11 wherein said thermoelectric unit includes hot air ducts adjacent opposite side walls of said cabinet with blower means for passing room air through said hot air ducts to draw heat away from the thermoelectric cooling unit, and wherein said receptacle is open at the top and located in the path of said hot air ducts to cause moisture therein to be evaporated by the air flow in said hot air ducts.

References Cited by the Examiner

UNITED STATES PATENTS

| | | | |
|---|---|---|---|
| 2,502,263 | 3/1950 | Lewis | 62—261 |
| 2,702,546 | 2/1955 | Gilroy | 62—261 |
| 3,085,405 | 4/1963 | Frantti | 62—3 |
| 3,138,934 | 6/1964 | Roane | 62—3 |
| 3,194,024 | 7/1965 | Bassett | 62—3 |

WILLIAM J. WYE, *Primary Examiner.*